(12) United States Patent
Onuma et al.

(10) Patent No.: US 8,581,531 B2
(45) Date of Patent: *Nov. 12, 2013

(54) POWER CONVERTER DEVICE

(71) Applicants: Yusaku Onuma, Funabashi (JP); Yusuke Arao, Narashino (JP)

(72) Inventors: Yusaku Onuma, Funabashi (JP); Yusuke Arao, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,704

(22) Filed: Jan. 16, 2013

(65) Prior Publication Data

US 2013/0127380 A1  May 23, 2013

Related U.S. Application Data

(63) Continuation of application No. 12/938,494, filed on Nov. 3, 2010, now Pat. No. 8,362,722.

(30) Foreign Application Priority Data

Nov. 4, 2009  (JP) ................................ 2009-252573

(51) Int. Cl.
*H02P 3/00* (2006.01)
(52) U.S. Cl.
USPC .. 318/375; 318/370; 318/400.02; 318/400.14
(58) Field of Classification Search
USPC ................ 318/375, 802, 370, 400.02, 400.14
See application file for complete search history.

(56) References Cited

U.S. PATENT DOCUMENTS

| 4,994,950 | A | | 2/1991 | Gritter | |
|---|---|---|---|---|---|
| 5,285,145 | A | * | 2/1994 | Minowa et al. | 318/808 |
| 5,811,957 | A | * | 9/1998 | Bose et al. | 318/802 |
| 6,031,738 | A | | 2/2000 | Lipo et al. | |
| 6,134,578 | A | | 10/2000 | Ehlig et al. | |
| 6,566,764 | B2 | | 5/2003 | Rebsdorf et al. | |
| 6,856,038 | B2 | | 2/2005 | Rebsdorf et al. | |
| 7,109,742 | B2 | | 9/2006 | de Larminat et al. | |
| 7,176,644 | B2 | * | 2/2007 | Ueda et al. | 318/400.14 |
| 7,239,168 | B2 | | 7/2007 | de Larminat et al. | |
| 7,285,930 | B2 | | 10/2007 | Weinmann et al. | |
| 7,294,989 | B2 | | 11/2007 | Saren | |
| 7,339,394 | B2 | | 3/2008 | de Larminat et al. | |
| 7,414,425 | B2 | | 8/2008 | O'Gorman et al. | |

(Continued)

FOREIGN PATENT DOCUMENTS

| KR | 10-0289710 | 11/1995 |
|---|---|---|
| KR | 20-0123002 | 8/1996 |

*Primary Examiner* — Paul Ip
(74) *Attorney, Agent, or Firm* — Antonelli, Terry, Stout & Kraus, LLP.

(57) ABSTRACT

An electric power converting apparatus includes a switching circuit, a PWM controller, conducting PWM all phase shut-off and zero-vector outputting, a unit configured to detect or estimate current flowing through a motor, a unit configured to conduct a DC braking, and a current comparator configured to compare between a DC braking time maximum current setup value, and a current value obtained by the unit configured to detect or estimate current. The PWM all phase shut-off and zero-vector outputting are conducted, repetitively, by the PWM controller, if the current comparator determines that a current value, which is obtained by the unit configured to detect or estimate current, exceeds the DC braking time maximum current setup value, when conducting the DC braking to obtain a braking power by running current through the motor.

3 Claims, 2 Drawing Sheets

(56) References Cited

U.S. PATENT DOCUMENTS

| | | |
|---|---|---|
| 8,174,219 B2 * | 5/2012 | Oomura .................. 318/400.02 |
| 2002/0070715 A1 | 6/2002 | Sasaki et al. |
| 2004/0245949 A1 * | 12/2004 | Ueda et al. .................. 318/254 |
| 2005/0073280 A1 | 4/2005 | Yoshinaga et al. |
| 2005/0248361 A1 | 11/2005 | O'Gorman et al. |
| 2006/0006899 A1 | 1/2006 | de Larminat et al. |
| 2006/0103417 A1 | 5/2006 | Larminat et al. |
| 2006/0113939 A1 | 6/2006 | Saren |
| 2006/0113952 A1 | 6/2006 | Zhou et al. |
| 2006/0125513 A1 | 6/2006 | de Larminat et al. |
| 2007/0194734 A1 | 8/2007 | Weinmann et al. |
| 2009/0315492 A1 * | 12/2009 | Oomura .................. 318/400.02 |

* cited by examiner

POWER CONVERTER DEVICE

CROSS REFERENCE TO RELATED APPLICATION

This application is a continuation of U.S. application Ser. No. 12/938,494, filed Nov. 3, 2010, now U.S. Pat. No. 8,362,722, the contents of which are incorporated herein by reference.

This application relates to and claims priority from Japanese Patent Application No. 2009-252573 filed on Nov. 4, 2009, the entire disclosure of which is incorporated herein by reference.

BACKGROUND OF THE INVENTION

The present invention relates to a power converter device.

Conventionally, when stopping rotation of a permanent magnet synchronous motor, it is common to stop power supply thereto, simply, and thereby stopping it naturally, with using an axial load and air resistance thereof.

When there is necessity of stopping the permanent magnet synchronous motor, abruptly, it is decelerated for a predetermined time or down to a predetermined ration speed, through regenerative braking, and thereafter it is stopped naturally.

Or, there is already known a method, so-called a direction current braking (or DC braking) of turning ON, either one (1) phase or two (2) phases on a positive (+) electrode side(s) of a switching circuit, with a negative side of other phase, continuously, so as to run direct current through that motor, thereby achieving the braking thereof.

As is disclosed in the following Patent Document 1, there is also already known a method of turning ON either one (1) phase on the negative electrode side of the switching circuit, while brining the positive electrode side of the remaining other phases into a PWM operation; thereby conducting the DC braking.

However, when decelerating or stopping the permanent magnet synchronous motor through the DC braking, excessive current is generated when it is rotating at high speed, and this results into demagnetization and burning of that motor, or breakage of a switching element(s) of a power converter device. Also, if the power converter is provided with a protection with using an over-current, an output is cut off because of that protection, and the permanent magnet synchronous motor is brought into a free-run condition; therefore, it is impossible to execute the DC braking with stability.

In the following Patent Document 1 is disclosed a method of decelerating the motor through reversed phase braking, when it is rotating at the high speed, so as to detect that the rotation speed reaches to a certain speed of a low rotation speed, and thereby switching it into the DC braking.

PRIOR ART DOCUMENTS

Patent Documents

[Patent Document 1] Japanese Patent Laying-Open No. 2002-374689 (2002).

BRIEF SUMMARY OF THE INVENTION

When cutting off the power supply to stop the permanent magnet synchronous motor, since braking power is determined by magnitude of the axial load and/or the air resistance, therefore it is impossible to obtain a desired braking power, and thereby brining about a drawback that it takes a long time until the stoppage thereof.

When decelerating and stopping the permanent magnet synchronous motor through the regenerative braking, it is necessary to provide a control means for decelerating and stopping, separately, and there is also possibility of loss of synchronization, in particular, when decelerating it abruptly. And, in a use thereof within a fan and a pump, etc., there is also a problem, i.e., necessitating detection or estimation of the rotation speed and induction voltage thereof, as well as, provision of a special starting means, separately, so as to execute the starting thereof with using of those, in particular, when the permanent magnet synchronous motor is rotating under the free-run condition.

When decelerating and stopping the permanent magnet synchronous motor through the DC braking, in particular, when it is rotating at the high speed, the excessive current is generated, and this results into demagnetization and burning of that motor, or breakage of the switching element(s) of the power converter device. Also, there is a problem that, if the power converter is provided with the protection with using the over-current, the output is cut off because of that protection, and that the permanent magnet synchronous motor is brought into the free-run condition; therefore, it is impossible to execute the DC braking with stability.

When decelerating and stopping the permanent magnet synchronous motor through the reversed phase braking, the braking force is in shortage, in particular, when it is rotating at the low speed, and then it takes a long time until when it is decelerated down to a desired speed and the stoppage thereof. Also, when it is rotating at the high speed, the excessive current is generated, and this results into demagnetization and burning of that motor, or breakage of the switching element(s) of the power converter device. And also, if the power converter is provided with the protection with using the over-current, the output is cut off because of that protection, and that the permanent magnet synchronous motor is brought into the free-run condition; i.e., there is a problem that it is impossible to execute the DC braking with stability.

With the method disclosed in the Patent Document 1 mentioned above, there is a necessity of providing a means for detecting the rotation speed of the motor.

Thus, an object according to the present invention, for dissolving such the problems as mentioned above, is to provide a stopping method for enabling a motor to obtain a stable braking power even when rotating at a high speed, and also to obtain a large braking power even when rotating at a low speed, without necessity of a rotation speed detecting means of the motor or an external braking, as well as, to output a desired stopping torque after stoppage thereof.

For dissolving such the drawbacks as was mentioned above, according to the present invention, there is provided a power converter device, comprising: a switching circuit, which is configured to convert DC to AC; a PWM controller means, which is configured to control ON or OFF of said switching circuit; a means, which is configured to detect or estimate current flowing through a permanent magnet synchronous motor; and a means, which is configured to execute DC braking of said permanent magnet synchronous motor, wherein there are provided a DC braking maximum current setup value, which is determined from an outside or is determined in advance within an inside, and a PWM all-phases cutoff function and a zero vector output function within said PWM controller means, within said PWM controller means, whereby the PWM all-phases cutoff and the zero vector output are repeated within said PWM controller means, if a current value, which is obtained by said means for detecting or estimating the current, exceeds said DC braking maximum current setup value, when running DC current to the permanent magnet synchronous motor, so as to execute DC braking for obtaining a braking power.

According to the present invention, there can be obtained a power converter device for driving a permanent magnet synchronous motor, i.e., enabling to obtain a stable braking power even when it is rotating at a high speed, and/or a large braking power even when it is rotating at a low speed, without necessity of a rotation speed detecting means of the motor or an external brake, as well as, outputting a desired stopping torque even after stoppage thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings.

Embodiment 1

Figure 1:
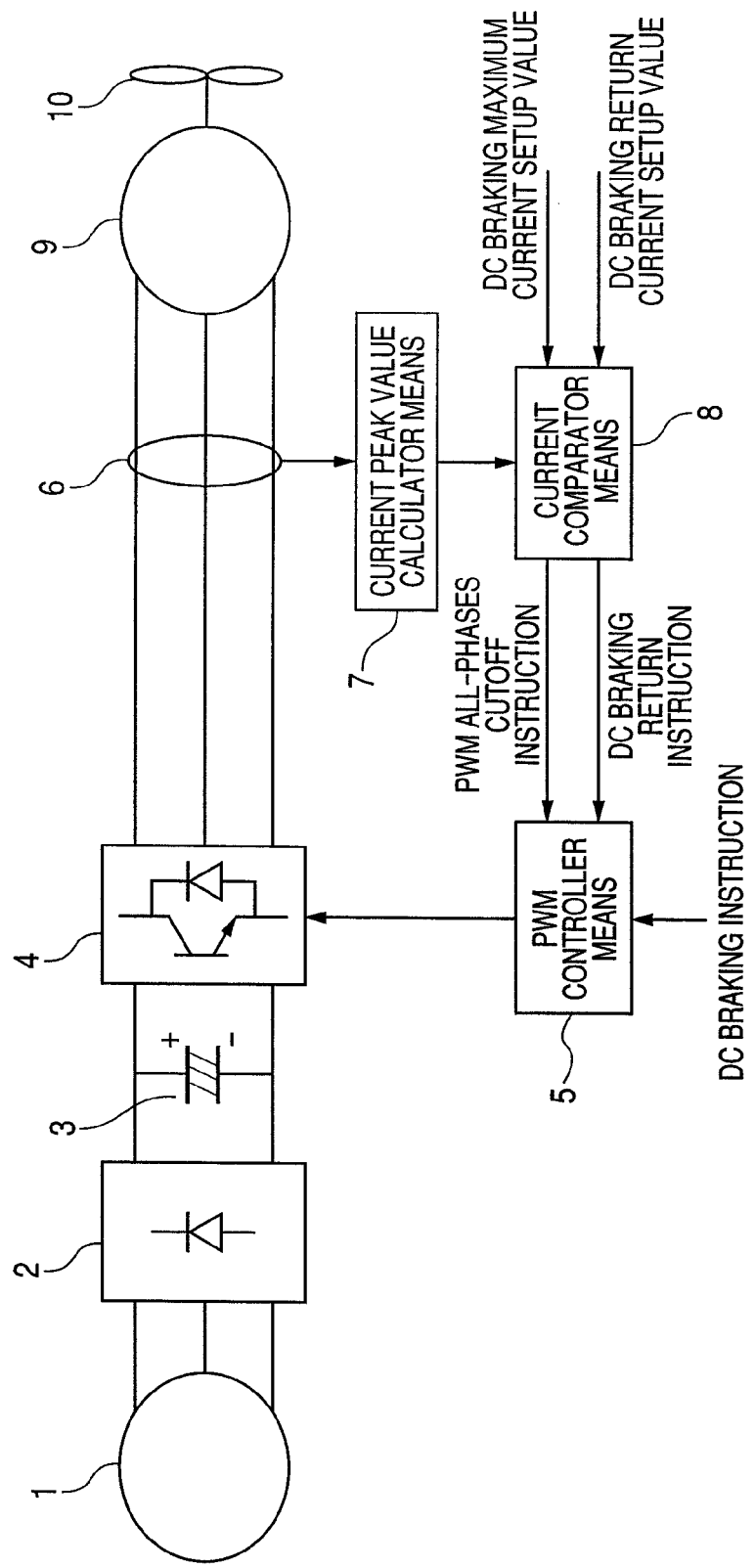
FIG. 1 is a view for showing the structures of a power converter device, according to an embodiment 1 of the present invention.

FIG. 1 is a block circuit diagram for showing an embodiment according to the present invention. AC voltage generating from a AC power source 1 is rectified within a rectifier circuit 2, and it is smoothed by a smoothing circuit 3. DC current smoothed is converted to AC voltage through a switching circuit 4, thereby to be applied to a permanent magnet synchronous motor 9.

A PWM controller means 5 controls ON and OFF of the switching circuit 4, so that random voltage can be applied to the permanent magnet synchronous motor 9.

A current detector means 6 detects phase current running through the permanent magnet synchronous motor 9. Or, a shunt resistor may be provided on a negative electrode side of the smoothing circuit 3, so as to estimate the phase current from the current flowing through this shunt resistor. A fan 10 is attached onto a shaft of the permanent magnet synchronous motor 9.

Figure 2:
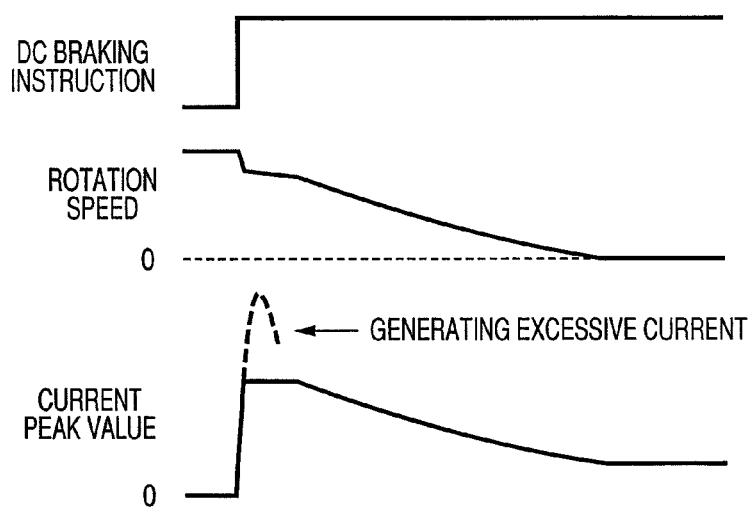
FIG. 2 is a view for showing an example of waveforms of rotation speed and current when executing the DC braking.

FIG. 2 shows an example of waveforms of rotation number and current when the DC braking is taken place. When an output of the switching circuit 4 is cut off and the permanent magnet synchronous motor 9 is in the free run condition, and if the fan 10 is rotated by the air, then the permanent magnet synchronous motor 9 rotates in the similar manner, and then induction voltage is generated depending on the rotation speed thereof. When an instruction of the DC braking is given to the PWM controller means 5, then the PWM controller means 5 controls the switching circuit 4 in such a manner that direct current flows into any one of the phases of the permanent magnet synchronous motor 9, and thereby applying the voltage onto the permanent magnet synchronous motor 9. In this instance, current flows through the permanent magnet synchronous motor 9, depending upon a potential difference between the induction voltage generating from the permanent magnet synchronous motor 9 and the voltage applied. If the potential difference mentioned above is large, then current flowing through the permanent magnet synchronous motor 9 becomes large, as is shown by a broken line in FIG. 2.

Figure 3:
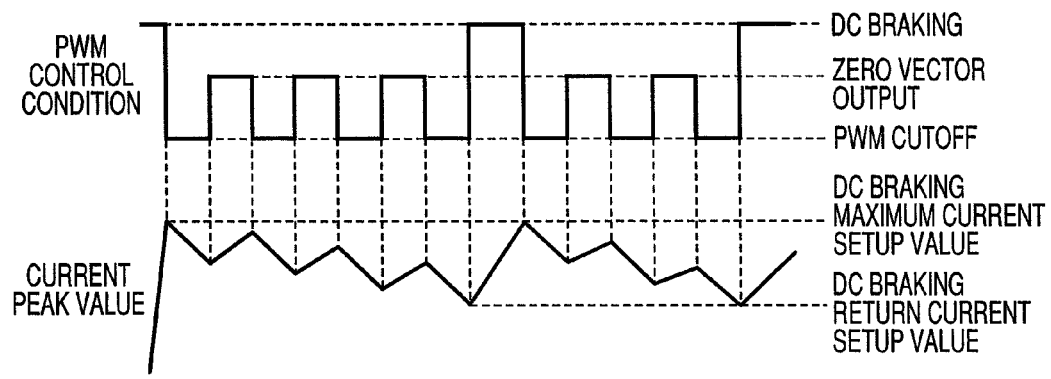
FIG. 3 is a view for showing waveforms of signals, for explaining the operations of the power converter device according to the embodiment 1.

FIG. 3 is a view for showing waveforms of signals, for explaining the operations of the present invention. From the current, which is detected by the current detector means 6 when executing the DC braking, a peak value of the current is calculated by a peak-value calculator means 7. This peak value is compared with a DC braking maximum current setup value, which is determined from an outside or is determined in advance within the power converter device, by means of a current comparator means 8, and if the peak value of the current exceeds the DC braking maximum current setup value, an instruction of cutting off all phases of PWM (being called "PWM all-phases cutoff instruction") is inputted into the PWM controller means 5.

The PWM controller means 5, upon receipt of the PWM all-phase cutoff instruction controls the switching circuit 4, in such a manner that it repeats the following outputs; i.e., a PWM all-phases cutoff output, for compulsively turning all phases of the switching circuit 4 OFF, and a zero vector output, for turning all phases of the positive electrode side or of the negative electrode side ON while turning all phases of remaining other electrode side OFF, at an appropriate frequency.

With such the operations as was mentioned above, the current flowing through the permanent magnet synchronous motor 9 is suppressed.

The peak value of current, which is calculated from the current detected by the current detector means 6 within the peak-value calculator means 7, is compared with a DC braking return current setup value, which is determined from an outside or is determined in advance within the power converter device, by means of a current comparator means 8, and if the peak value of current is equal to or less than the DC braking return current setup value, a DC braking return instruction is inputted into the PWM controller means 5.

The PWM controller means 5, when the DC braking return instruction is inputted therein, controls the switching circuit 4 so as to repeat the DC braking, again.

With conducting the PWM all-phases cutoff output and the zero vector output and the DC breaking, repetitively, it is possible to obtain a stable braking power, with suppressing the current, as is shown by a solid line in FIG. 2.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An electric power converting apparatus, comprising:
   a switching circuit, which is configured to invert DC to AC;
   a PWM controller, which is configured to control ON or OFF of the switching circuit, thereby conducting PWM all phase shut-off and zero-vector outputting;
   a unit, which is configured to detect or estimate current flowing through a motor;

a unit, which is configured to conduct a DC braking; and a current comparator, which is configured to compare between a DC braking time maximum current setup value, which is determined from outside or is determined from inside in advance, and a current value, which is obtained by the unit configured to detect or estimate current, wherein the PWM all phase shut-off and zero-vector outputting are conducted, repetitively, by the PWM controller, if the current comparator determines that a current value, which is obtained by the unit configured to detect or estimate current, exceeds the DC braking time maximum current setup value, when conducting the DC braking to obtain a braking power by running current through the motor.

2. The electric power converting apparatus, according to claim 1, wherein the PWM controller controls so as to run DC current flows in accordance with an ordinal DC braking, if the current value, which is obtained by the unit configured to detect or estimate current, is equal or lower than the DC braking time maximum current setup value.

3. The electric power converting apparatus, according to claim 1, wherein the current is obtained by detecting phase current flowing through the motor, or estimating phase current from current flowing through a shunt resistor, which is provided in a smoothing circuit, in the unit configured to detect or estimate current.

* * * * *